United States Patent Office.

THOMAS J. BUTCHER, OF WENONA STATION, ILLINOIS.

Letters Patent No. 92,937, dated July 27, 1869.

IMPROVED MEDICAL COMPOUND.

The Schedule referred to in these Letters Patent and making part of the same.

*To all whom it may concern:*

Be it known that I, THOMAS J. BUTCHER, of Wenona Station, in the county of Marshall, and State of Illinois, have invented a new and improved Medical Compound; and I do hereby declare that the following is a full, clear, and exact description thereof, which will enable others skilled in the art to make and use the same.

This invention relates to a new and improved composition for medical purposes; and consists in the use of the ingredients hereinafter named, prepared as described.

In carrying out my invention and discovery, and forming the compound, I, in the first place, boil, in a suitable vessel, ten gallons of water, containing white-oak bark, in the proportion of about one pound of the bark to a gallon of water. This mixture is boiled down to about two gallons.

To the two gallons, I add two ounces of camphor, four ounces of saltpetre, and four ounces of alum.

The compound is then strained through a fine cloth or other fine strainer, and bottled for use.

Where any astringent medicine is required, either to be taken internally, or to be applied externally, this compound never fails in producing the desired effect.

For piles, for external roses, as well as for dysentery, summer-complaint, and all diseases and affections of a similar nature, it is an invaluable remedy.

Having thus described my invention,

I claim as new, and desire to secure by Letters Patent—

The medical compound composed of the ingredients above mentioned, in about the proportions named, and prepared substantially as described, for the purposes set forth.

The above specification of my invention signed by me, this 7th day of June, 1869.

THOMAS J. BUTCHER.

Witnesses:
J. KALATON,
J. A. WALKER.